Figure 1:
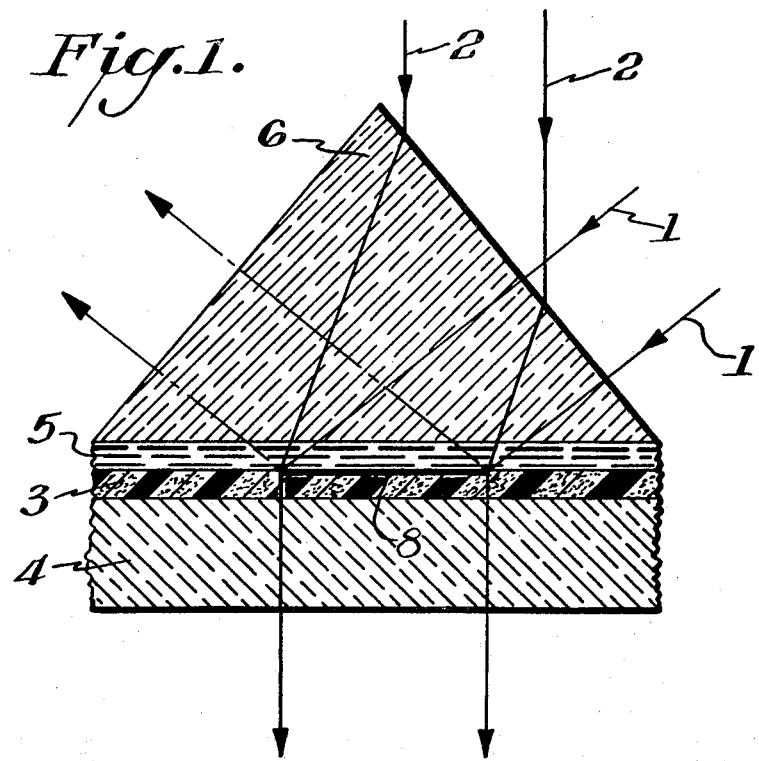

United States Patent

Nassenstein

[15] 3,635,540
[45] Jan. 18, 1972

[54] HOLOGRAPHY WITH SURFACE WAVES

[72] Inventor: Heinrich Nassenstein, Leverkusen, Germany

[73] Assignee: AGFA-Gevaert Aktiengesellschaft, Leverkusen, Germany

[22] Filed: Sept. 2, 1969

[21] Appl. No.: 854,390

[30] Foreign Application Priority Data

Sept. 19, 1968 Germany..................P 17 97 362.5

[52] U.S. Cl..........................................350/3.5, 350/96 WG
[51] Int. Cl. ......................................................G02b 27/00
[58] Field of Search ........................96/27 H; 350/3.5, 96 WG

[56] References Cited

OTHER PUBLICATIONS

Steston, Applied Physics Letters, Vol 11, No. 7, Oct. 1967, pp. 225– 226 and Vol. 12, No. 11, June 1968, pp. 362– 364
von Fragstein, Annalen Der Physik, Vol. 4, No. 8, 1949, pp. 271– 278

*Primary Examiner*—David Schonberg
*Assistant Examiner*—Ronald J. Stern
*Attorney*—Connolly and Hutz

[57] ABSTRACT

A process for the production of holograms wherein only one information carrying spatial frequency is used for recording by simultaneous exposure of a light-sensitive recording material to an imagewise modulated coherent object beam and one coherent reference beam. Further a process for the reconstruction of the hologram wherein the reference beam is the inhomogeneous surface beam which is created on total reflection in the optically thinner medium of the recording layer.

The holograms obtained by the process can be used for the production of semiconductor microcircuit images.

9 Claims, 2 Drawing Figures

PATENTED JAN 18 1972

3,635,540

HOLOGRAPHY WITH SURFACE WAVES

The invention relates to a process for the production and reconstruction of holograms, using the inhomogeneous surface waves in the optically thinner medium of the recording layer which is produced there under the conditions of total reflection.

A holographic process is known in which the reference beam in the recording layer is totally reflected at the interface of the layer with air. This process has advantages for several fields of application. Thus in the reconstruction of the hologram, the object space remains free from reference beams so that real images of large surface area can be produced and the distance between the hologram and the object can be substantially reduced. Reproduction faults are thus reduced to a corresponding extent.

It is a disadvantage of this process that the structure of the hologram extends through the whole thickness of the recording layer so that the faults which are known to occur in the photographic production of a hologram due to swelling of the layer and shrinkage also occur here.

In this process, a hologram is taken in the conventional manner by super position of the reference beam on the object beam. Since the reference beam in this process consists of the incident and the totally reflected beam, two holograms of very different spatial frequencies are produced which in practical use have a different effect and moreover may result in additional and unnecessary multiple reflections. This is a serious disadvantage of the process described.

It is the object of the invention to develop a process for the production and reconstruction of holograms using total reflection, which does not have the disadvantages of the above-mentioned known process.

A process for the production of holograms by simultaneous exposure of a light-sensitive recording material to an imagewise modulated coherent object beam and a coherent reference beam and for the reconstruction of the hologram by exposure to a coherent reference beam has now been found in which the reference beam used is composed of inhomogeneous surface waves alone, which are created in the optically thinner medium of the recording layer on total reflection. This type of reference beam is now called "inhomogeneous surface beam." A hologram produced in this way may, however, also be reconstructed with a reconstruction beam other than the inhomogeneous surface beam, e.g., an obliquely incident plane beam.

Since in total reflection the inhomogeneous surface beam forms only in a very thin surface region of the optically thinner recording layer along the interface between the optically thicker medium and the optically thinner recording layer, the hologram produced has a very thin layer thickness of the order of a few wavelengths of the coherent light. This effect is highly advantageous because the hologram is much less sensitive to the phenomena of uneven swelling and shrinkage which occur on photographic processing of the exposed recording layer. Furthermore no complications are introduced by the incident beam. The hologram produced by the process according to the invention comes very close to the ideal of a two-dimensional hologram.

Conventional silver halide emulsion layers which have a high power of resolution are especially advantageous for producing holograms by the process according to the invention. Photographic materials in which the light-sensitive layer is applied as the optically relatively thin medium to a layer support which is made of a material of substantially higher refractive index than that of the layer are especially useful. Support layers of glass of high-refractive index, for example, are suitable for this purpose. This material has the advantage that the layer can be exposed directly through the support layer. The inhomogeneous surface beam is then formed at the interface between the support layer and the light-sensitive layer. The hologram structure extends through only a slight thickness in the parts of the layer near the layer support and is thus highly stabilized. The parts of the layer lying above this then act as protective layer for the real information-carrying layer.

Figure 2:
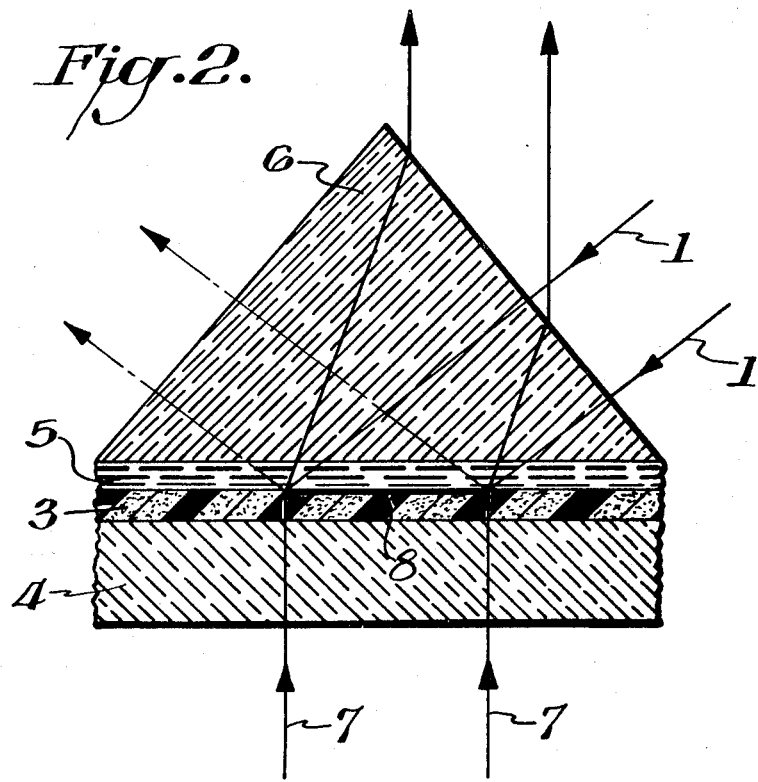

Another embodiment is shown diagrammatically in the accompanying FIGS. 1 and 2. In FIGS. 1 and 2 the light-sensitive layer 3, for example a silver halide emulsion layer, which is arranged on the support layer 4 is brought into optical contact with a glass prism 6 through a layer of liquid 5. When producing the hologram the light-sensitive layer is exposed simultaneously to the imagewise modulated object beam 2 and the reference beam 1. The reference beam enters at such an angle that total reflection takes place.

The inhomogeneous surface beam is formed in the region 8 of the layer at the interface between the contact liquid and the light-sensitive layer and enters the photographic layer to a depth of the order of the wavelength of the light to leave it after a certain time. The hologram structure is formed in this thin region of the layer.

In this arrangement, the imagewise modulated object beam may, of course, also reach the light-sensitive layer through the rear of the light-sensitive material, as indicated by ray 7 in the figure.

In the process according to the invention, only a single hologram structure with a clearly defined carrier spatial frequency is produced, thereby obviating all the disadvantages of the known process in which, as described above, two superimposed holograms with different spatial frequencies are obtained.

The process according to the invention can be used for producing all sorts of different types of holograms, for example absorption holograms in which the structure which carries the information consists of a material which absorbs visible light, for example metallic silver, or phase holograms which are produced from absorption holograms by bleaching the developed silver. The different types of holograms have been described, for example in the publication "Hologram, Efficiency and Response" by Kogelnik in Microwaves Laser Technology, 1967, pages 68–73, or the publication by H. Nassenstein, "Zeitschrift für Angewandte Physik," Volume 22, (1966), pages 37–50.

The process of the invention is otherwise suitably carried out with the light-sensitive materials and apparatus customarily used in holography.

Holograms which provide images of extremely high resolution on reconstruction are obtained by the process of the invention. The degree of resolution is of the order of high-quality microscope lens systems. One practical application, for example, lies in the fact that these holograms can be used as masks for the production of microcircuit systems in semiconductor technology.

EXAMPLE 1

A photographic material which comprises a silver iodobromide emulsion layer containing 3 mols percent of silver iodide on a glass support is used. The particle size is about 0.05 $\mu$m. The usual commercial photographic plates of the type Gevaert-Agfa Scientia (8 E 70), for example, may suitably be used. As indicated in the accompanying figure, the light-sensitive layer is brought into optical contact with a flint glass prism (refractive index $n=1.73$) by means of diiodine methan which is used as the contact liquid of high-refractive index. An He-Ne laser is used as light source.

The reference beam (ray 1 in the figure) used is a plane wave which meets the interface of contact liquid and silver halide gelatine layer at such an angle that total reflection takes place there. Only the inhomogeneous surface beam which travels in the emulsion layer along the interface can therefore become photographically active in the emulsion layer.

The imagewise modulated object beam is a plane wave which enters the interface of contact liquid and emulsion layer at such a small angle of incidence from the prism side that it is not totally reflected there.

The exposed photographic material is developed in a developer of the following composition:

| | |
|---|---|
| Hydroquinone | 3.5 g. |
| p-methylaminophenol | 7.5 g. |
| KB$_r$ | 3.0 g. |
| Na$_2$SO$_3$ | 40 g. |
| Na$_2$CO$_3$ | 30 g. |
| H$_2$O | 1,000 ml. | and then fixed with a sodium thiosulphate solution.

The hologram produced in this way is reconstructed in the usual manner with a similar arrangement, the inhomogeneous surface beam being used also for the reconstruction.

Similar results are obtained if, as indicated in the drawing, the object beam used for the production of the hologram is made to enter the light-sensitive layer not from the prism side but through the support layer.

EXAMPLE 2

A silver iodobromide gelatine emulsion layer which has a refractive index of 1.63 is applied to a layer support of flint glass which has a refractive index of $n=1.73$. The critical angle of total reflection is 70° C. A helium-neon laser is used for exposure. The reference beam has an angle of incidence of 73° C., measured within the glass support so that the reference beam is totally reflected at the contact face to the gelatine layer and is propagated as a inhomogeneous surface wave in the light-sensitive layer. At the same time, holographic exposure is carried out with the object beam which may be either a plane wave or any other wave which enters the photographic material from the layer side.

The layer is then photographically processed in the usual manner. Inspection of the resulting hologram by microscopic sections shows that the photographic gelatine layer contains the blackening hologram only in the immediate vicinity of the glass support. By far the greater part of the layer is not blackened.

Reconstruction of the hologram may be carried out either with the same inhomogeneous surface beam as the reference beam or with a homogeneous wave reference beam.

I claim:

1. In a process of recording a hologram in a light-sensitive material by the interference of an object beam and a coherent reference beam the steps of:
   directing the reference beam onto a boundary between an optical medium and a layer of light-sensitive material having a lower refractive index than said optical medium at such an incidence angle that the reference beam is totally reflected at said boundary, whereby an inhomogeneous surface wave is produced exponentially decaying in the light-sensitive material at said boundary,
   directing the object beam onto said boundary at such an angle as to transmit the object beam through the boundary, whereby the object beam interferes with the inhomogeneous surface wave in the light-sensitive material to form the hologram.

2. The process as claimed in claim 1 wherein the optical medium having the higher refractive index is a transparent support for the light-sensitive material.

3. The process as claimed in claim 2 wherein the optical medium is a prism.

4. The process as claimed in claim 2 wherein the light-sensitive material on the transparent support is a silver halide emulsion layer.

5. The process as claimed in claim 1 wherein a transparent body adjacent to but spaced from the light-sensitive layer receives and passes the beams and the optical medium is a transparent liquid material filling the space between the body and the layer.

6. The process as claimed in claim 5 wherein the transparent body is a prism.

7. A hologram in a light-sensitive material produced by the process of claim 1.

8. The process of claim 1 wherein the light-sensitive material is a silver halide emulsion.

9. In the process of claim 1 the step of controlling the depth of the hologram in the layer of the light-sensitive material by controlling said angle of incidence.

* * * * *